Needham & Nelson.
Harvester Rake.
N° 46486. Patented Feb. 21, 1865.

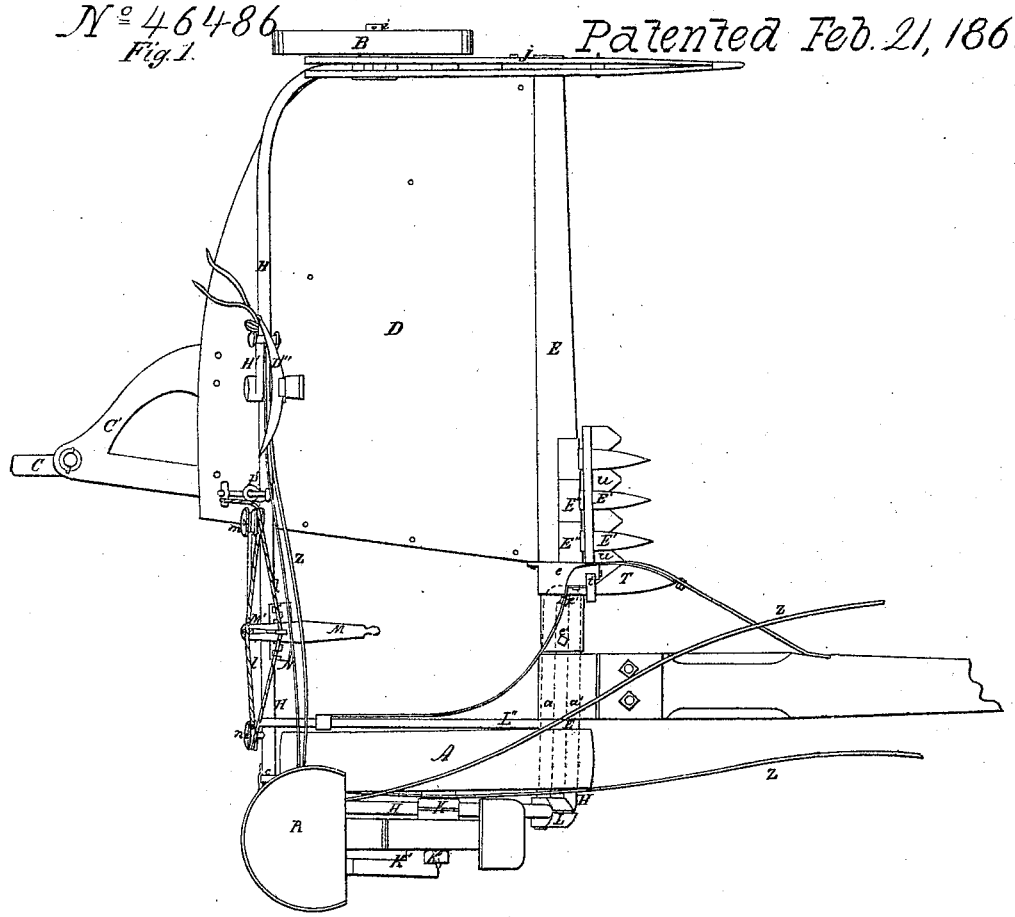
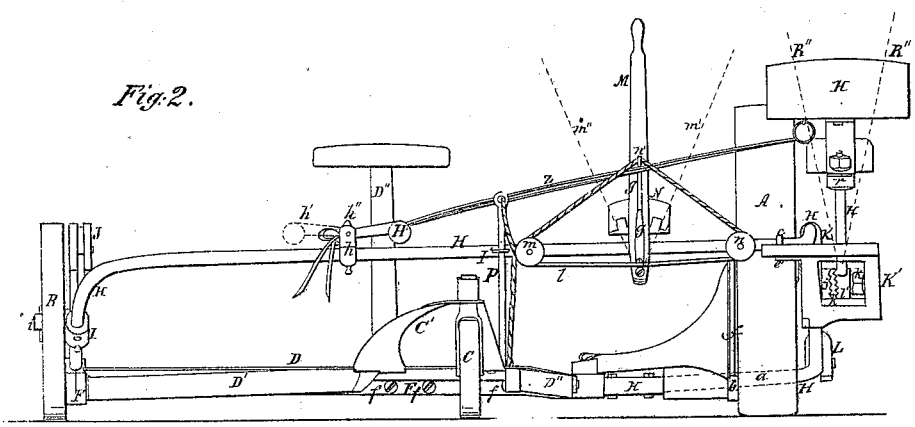

Witnesses
J. G. Munlove
William Gent

Inventors
John Nelson
Wales Needham

UNITED STATES PATENT OFFICE.

W. NEEDHAM AND J. NELSON, OF ROCKFORD, ILLINOIS.

IMPROVEMENT IN HARVESTERS.

Specification forming part of Letters Patent No. 46,486, dated February 21, 1865.

*To all whom it may concern:*

Be it known that we, W. NEEDHAM and J. NELSON, of Rockford, Winnebago county, Illinois, have invented certain new and useful Improvements in Harvesters; and we do hereby declare that the following is a full and complete description of the construction and operation of the same, reference being had to the accompanying drawings, making a part of this specification, in which—

Figures 3, 9:
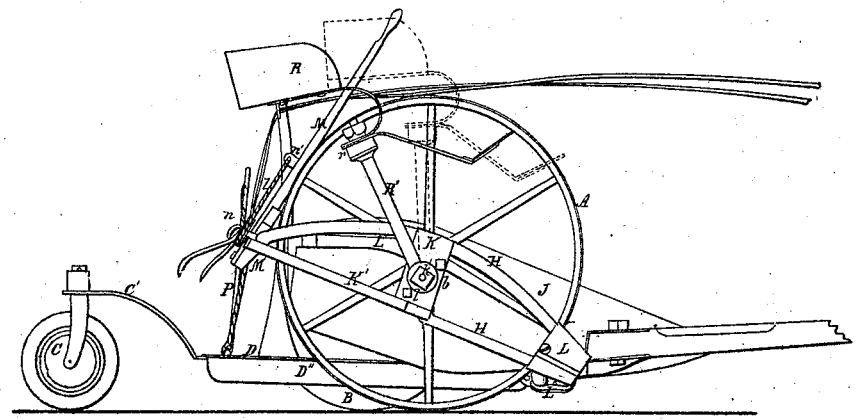

Figure 1 is a top view. Fig. 2 is a view of the rear end. Fig. 3 is a side elevation. Figs. 4, 5, 6, 7, 8, 9, and 10 are detached sections, which will be referred to in the description.

Similar letters of reference denote like parts in the several views.

The nature of our invention relates to constructing a harvester in such a manner and of such material as to combine strength and durability with as little weight as possible, at the same time to be most perfect and effective in its operation.

In the drawings, A represents the driving-wheel; B, the grain-wheel; C, the caster, and D, the platform.

Figure 4:
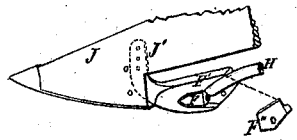
Figure 5:
Figure 7:
Figure 8:
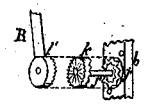

The cutter-bar E is made of plate-iron, cut out in the proper form and folded together, forming a smooth curved edge on the outside, that, when viewed from the end, as in Figs. 4 and 7, presents a V-shaped form. Between these plates, forming the upper and lower sides of the bar, there is fitted a piece of wood, F, Figs. 2, 4, and 7, that extends along the cutter-bar till where the inner end, $e$, is connected to the frame.

The guards E' are made with curved shanks E'', that fit on the cutter-bar, the inner faces of which, corresponding in shape to the outer edge of the bar, to which they are secured by bolts $f$, extending from the back edge of the bar through the wood into the guards, as shown in Figs. 2 and 7. The guards being attached in this way, there are no bolt-heads on either side of the cutter-bar; but both are perfectly smooth, allowing the grain and grass to pass back unobstructed.

Figure 6:
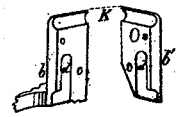

The frame of the machine is made of tubular iron, which gives equal strength and durability with less weight than if it were solid. The tubular frame H at the grain end of the machine is secured in the compound socket F', which forms a socket for the end of the cutter-bar and the end of the frame, as represented in Fig. 4, the detached piece F'' being designed to fit on, as indicated, and secured by a bolt, holding the end of the frame firmly in place. The frame extends along under the dividing-runner J, through the sleeve I, (shown in Fig. 2,) round along the rear end of the machine to the outside of the driving-wheel, where it is turned to a right angle and bent up in an arched form, as seen in Fig. 3, passing through a clamp or socket, K, in the center and the clamp L at the front end of the arch, where it is again bent to a right angle and extends along in front of the wheel, passing through a clamp, L', on the end of the brace L'', (represented in Fig. 5,) and extends to the inner end, $e$, of the cutter-bar, where it is curved round and turned back, as indicated by the dotted lines $a$ $a'$ in Fig. 1, passing through the clamp L' into a socket in the clamp L, where it turns the corner and extends up under the arch till about the center of the wheel, as shown in Fig. 8, where it again turns a right angle upward into the clamp K, and is fastened in the pieces $b$ $b'$, a perspective view of the inside of which is shown in Fig. 6, which form a compound clamp or socket, $d$, being the socket for the end of the frame. In this way the frame of the machine is made double from the inner end of the cutter-bar round to the center of the driving-wheel, where it is connected to the gear-frame, thereby greatly increasing the strength of this part of the frame, which is very essential. The upper part of the frame at the side of the wheel, being arched, as described, also adds much to its strength at the point where needed.

The piece $b$ of the clamp forms a part of the gear-frame K'. (Seen in Figs. 1, 2, and 3.) The rear end of the gear-frame is connected to the tubular frame by the stirrup $c$, fastened with nuts $c'$ on the under side. Where the frame is bent round at the end of the cutter-bar, it is secured by rivets or screws $e$, passing through the end of the cutter-bar, which forms a clamp at the conjunction of the cutter-bar with the frame; and in a similar manner it is secured to the clamp L' on the end of the brace L'', which extends up and is connected to the axle of the driving-wheel and fastened to the rear end of the frame, as shown in Fig. 1. The double part of the frame, from the end of the cutter-bar round in front of the wheel, is inclined upward, as indicated by the dotted lines *a* in Fig. 2, being secured in the desired position by the clamps, as described. The object of this is that in mowing, when the cutting apparatus rests upon the ground, this part of the frame will be elevated above the ground, so as to pass over the preceding swath of grass. It also facilitates the movement of the cutter-bar in passing smoothly over uneven surfaces and obstructions.

The dividing-runner J is connected to the grain end of the machine by an arm extending from the compound socket F, secured to the end of the guard-bar and frame, as before described, upward inside of the dividing-runner, as indicated at J', Fig. 4, to which it is secured by a bolt, and also at the rear end by a similar arm extending upward from the sleeve I. In both these arms and dividing-runner there are a series of holes, one above the other, which by changing the bolts the cutting apparatus can be adjusted to any desired point above or below the plane in which the dividing-runner moves. The sleeve I has a wrist, *i*, projecting horizontally, that forms the axle of the grain-wheel B. The dividing-runner, as will be seen in Fig. 1, extends from the grain-wheel to some distance in advance of the cutters, and the part of the runner in front of the cutting apparatus projects down sufficiently to get a bearing on the ground, forming a runner shape on the lower edge, which is bound round with metal, forming also a metal point on the end. This runner is one point on which the machine rests and moves along when it is used as a mower. It can be made to gather more grass or grain by placing the rear end of the runner inside of the arm at that end.

The grain-platform D is attached to pieces of wood D' D" underneath, and rests upon the front part of the machine, which sustains it at that end, the rear end being supported by the caster C, which is connected to the standard C', secured to the platform. The forking or raking standard D''' is arranged at the rear end of the platform, where the man stands to remove the grain. The object of having the man who is to operate the machine stand at the rear end of the platform, and of having this end sustained by the caster, is to relieve the frame of the machine from the strain which the man's weight would produce; and, also, there is not so much inclination of the platform in raising and lowering the cutting apparatus as there would be if it were not sustained by a caster.

Figure 10:
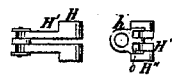

There is connected to the rear end of the frame an arrangement of devices designed to assist in driving the team, which consists of clamp-levers H', that are connected to a stirrup, *h*, secured to the frame, the reins Z being passed under the clamp through the openings *o o*. (Seen in Fig. 10.) If one or both of the clamps are turned, as indicated by the dotted lines *h'* in Fig. 2, the clamp *h"* comes down on the reins, (the heads H" being large and heavy,) holding them fast if pulled upon in the direction of the team; but if pulled in the opposite direction they are loosened instantly, the clamps moving back to the opposite position. (Shown in the figure.) Fig. 10 represents the device detached. Each rein in this device can be adjusted independent of the other. If the team is inclined to work from the standing grain, the rein to guide the team to travel nearer can be drawn tighter than the other, or vice versa. By means of this arrangement for driving the machine can be operated by one man when used as a reaper; or, if desired, a man can sit in the seat and drive and another one employed to rake off.

The arrangement for raising and lowering the cutting apparatus is connected to the frame midway between the standard D' and the seat, so that it can be operated by the man on the platform or the one in the seat by means of the lever M, that he can reach. At the base of this lever is a rack, N, secured to the frame, (forming an arm, N', below the frame,) to which the lower end of the lever is pivoted or hinged. In the middle of the lever, opposite the rack, is a spring-catch, *q*, that fits into the notches of the rack, the spring *q'* keeping it in place. The lever is connected to the platform by means of the rod P, which is jointed to the platform, and passes up through an eye, P', secured to the frame. To the top of this rod is attached the rope or chain *l*, that passes under the pulleys *m* and *n*, secured to the frame, up through an eye, *n'*, in the lever, down over the double pulley *m* to the platform, where it is attached. To change the position of the cutting apparatus, move the lever backward, which disengages the spring-catch from the rack, and then force it sidewise. By moving it as indicated by the dotted line *m'* the cutting apparatus is elevated, and by moving the lever as indicated by *m"* it is lowered. The rod P being firmly connected to the frame, as described, renders the cutting apparatus rigid in whatever position it is placed.

The seat R on the outside of the driving-wheel is supported by the standard R', to which it is connected, as represented. *r* is a tapering movable washer on the standard, by means of which the inclination of the seat can be adjusted to suit the position of the standard. On the outside of the piece *b* of the gear-frame and clamp there is a circular notched face, *j*, (shown in Fig. 8,) from the center of which projects a screw, *j'*. *k* is a tapering or wedge-shaped washer, having notches on both faces corresponding to the notches on the face *j*, and on the inside of the face *l'* on the lower end of the standard R', which are screwed onto the arm or screw *j'*, the notches matching into each other, with a nut, *k'*, on the end, firmly securing the seat in place. The seat is rendered perfectly adjustable by loosening the notched faces, and can be placed in any desired position, either moving the seat backward or forward, as indicated in Fig. 3, throwing the weight of the person in the seat in front or rear of the driving-wheel, and it can also be moved sidewise by means of the tapering washer $k$ throwing the person's weight to or from the machine, as indicated by the dotted lines R" R" in Fig. 2.

In the sickle-shoe T there is arranged a friction-roller, $t$, directly over where the cutter $u$ passes through the shoe, and rests upon the top of the sickle to keep the cutting-edge of the cutter close to the faces of the guards, allowing the cutter-bar to move back and forth with as little friction as possible. The crank which moves the cutter-bar is generally above the cutter-bar, and from the manner in which it is connected to the cutter-bar it tends to draw the cutter up from the guards in one of its movements, and the design of this friction-roller is to keep it down in place.

When this machine is used as a reaper, with all its parts adjusted for that purpose, the machine rests upon the driving-wheel, the grain-wheel, and caster, and the machine nearly balances; but when the grain-platform and caster are attached the weight of the rear end is increased, which elevates the front part of the machine, and this is the base from which the cutting apparatus is gaged in raising and lowering it. When used as a mower the grain-platform and caster are taken off and the machine rests upon the driving-wheel, the grain-wheel, and dividing-runner, the cutting apparatus inclining to rest upon the ground.

What we claim as our improvement, and desire to secure by Letters Patent, is—

1. The construction and arrangement of a tubular frame, substantially as and for the purpose set forth.

2. The sockets or clamps, as shown in Figs. 4, 5, 6, and 9, in combination with the tubular frame, for the purpose specified.

3. The gear-frame K,' with the clamp K, when constructed and combined with the tubular frame, as described.

4. The wedge-washer $k$, with serrated or notched faces, in combination with the notched face $l'$ of the standard and the notched face $j'$ in the clamp-piece $b'$, as and for the purpose set forth.

5. The wedge-washer $r$, in combination with the spring-seat R and standard R', in the manner and for the purpose set forth.

6. The clamp-levers H' H' and clamps $h''$ $h''$, in combination with the stirrup $h$, for the purpose specified.

7. The levers M, spring-catch $q'$, rack N, pulleys $m$ $n$, in combination with the rope or chain $t$ and adjustable standard P, for the purpose set forth.

8. In combination with the guard-bar E, provided with the wood center piece, F, attaching the guards, as and for the purpose set forth.

9. The combination of the adjustable dividing-runner J, the socket F', and sleeve I, when constructed and operating conjointly, as and for the purpose set forth.

WALES NEEDHAM.
JOHN NELSON.

Witnesses:
J. G. MANLOVE,
WILLIAM GENT.